United States Patent [19]

Pitassi et al.

[11] Patent Number: 4,889,013
[45] Date of Patent: Dec. 26, 1989

[54] TORQUE CONVERTER AND ASSEMBLY UTILIZING SAME

[75] Inventors: Vincent E. Pitassi, 20 Barrington Ave., Barrington, R.I. 02806; Angel Fernandez, Mt. Clemens, Mich.

[73] Assignee: Vincent E. Pitassi, Barrington, R.I.

[21] Appl. No.: 161,958

[22] Filed: Feb. 29, 1988

[51] Int. Cl.$^4$ .............................................. F16H 3/74
[52] U.S. Cl. ................................. 74/752 F; 74/125.5
[58] Field of Search ................... 74/752 F, 125.5, 112

[56] References Cited

U.S. PATENT DOCUMENTS

| | | | |
|---|---|---|---|
| 1,741,857 | 12/1929 | Lyman et al. | 74/752 F |
| 1,773,535 | 8/1930 | Lane | 74/752 F |
| 2,667,794 | 2/1954 | McGill | 74/752 F |
| 3,960,036 | 6/1976 | Moller | 74/802 |

FOREIGN PATENT DOCUMENTS

| | | | |
|---|---|---|---|
| 973985 | 11/1982 | U.S.S.R. | 74/752 F |
| 1193349 | 11/1985 | U.S.S.R. | 74/752 F |
| 1295106 | 3/1987 | U.S.S.R. | 74/125.5 |

*Primary Examiner*—Leslie A. Braun
*Assistant Examiner*—Christopher Campbell
*Attorney, Agent, or Firm*—Brooks & Kushman

[57] ABSTRACT

An inertial torque converter for converting a first torque into a second torque includes first and second unidirectional clutches which operate in opposite directions and which allow an output torque shaft to freewheel between received torque pulses. The converter includes a driving sun gear rotatable about a first axis, at least one planetary gear driven by the sun gear and a first eccentric mass mounted for rotation with the planetary gear about a second axis parallel to and radially spaced from the first axis. Preferably, two such planetary gears and masses are provided. The masses are connected through their journals to a carrier having a shaft portion which is connected to the first and second clutches. The second clutch is connected to the output torque shaft and the first clutch is connected to a housing of the converter to transmit the reaction torque of the converter thereto. A torque converter assembly includes a plurality of such serially connected torque converters, a common input driving shaft coupled to each of the driving sun gears and a common output torque shaft connected to one of the two unidirectional clutches of each of the torque converters. The masses of one converter have a predetermined phase relationship to the masses of the other torque converters for relatively smooth output torque generation wherein a number of torque pulses are generated for each revolution of the output torque shaft.

6 Claims, 2 Drawing Sheets

4,889,013

TORQUE CONVERTER AND ASSEMBLY UTILIZING SAME

TECHNICAL FIELD

This invention relates to torque converters and assemblies utilizing same and, in particular, to inertial torque converters and assemblies utilizing same wherein weighted planet gears are utilized to generate torque pulses to an output torque shaft which is not physically connected to a source of input torque.

BACKGROUND ART

There are many types of torque converters. For example, a hydrodynamic torque converter is a device in which torque is generated due to momentum exchange of a fluid, and power is transmitted due to flow of that fluid.

An inertial torque converter is another type of torque converter having a higher efficiency than the hydrodynamic device in that mechanical means, such as gears, sprag clutches and the like, provides the power exchange. Torque ratios of one order of magnitude higher than hydrodynamic units can thus be achieved. It is possible to design such inertial torque converters as continuously variable transmissions for tractive applications which consist only of an inertial torque converter stage with no additional gearing.

One type of inertial torque converter includes at least one weighted planet gear through which the exchange of momentum takes place and through which power is exchanged between input and output shafts.

One such inertial torque converter in disclosed in U.S. Pat. No. 4,498,357 to Makarov. The Makarov patent discloses a mass accelerator, power converter unit which utilizes centrifugal force generated by rotating masses which, when rotated within their respective cylindrical housings, exert pressure on the inner curved surfaces of the housings. The unit includes a wheel which interconnects each of the housings and which functions as a torque wheel to provide torque amplification. The drive mechanism causes the masses to rotate in synchronism with the associated housings. A driven mechanism is provided to facilitate withdrawal of energy from the unit.

The U.S. Pat. No. 3,960,036 to Moller discloses a torque converter for inclusion between a driving shaft and a driven shaft. A driving gear is rotatable about a primary axis and meshes with planetary gears rotatable about secondary axes parallel to the primary axis. The planetary gears are coupled to eccentric weights which are also rotatable about the secondary axes in a predetermined phase relationship. The planetary gears and weights are coupled to a driven gear which may be selectively meshed with one of a pair of pinions. Each pinion is provided with a unidirectional clutch engageable with a torque shaft having limited rotation and which is essentially fixed.

Other relevant U.S. patents of lesser interest are Reece et al U.S. Pat. No. 1,461,559, Sprigg, U.S. Pat. No. 1,791,386, Sheridan U.S. Pat. No. 1,812,176, and Gaston U.S. Pat. No. 2,077,556. West German Patent Document No. 2,612,035 is also relevant but is also of lesser interest.

DISCLOSURE OF THE INVENTION

An object of the present invention is to provide an improved inertial torque converter in which the input and output shafts are not physically connected, thereby providing shock-free, smooth operation.

Another object of the present invention is to provide an improved torque converter and assembly utilizing same wherein the prime mover is isolated from the load, thereby eliminating the possibility of overload due to drive line jamming.

Yet still another object of the present invention is to provide an improved inertial torque converter and assembly utilizing same wherein a first torque is converted to a second torque which, in turn, is transmitted to an output torque shaft in a pulsating yet smooth and continuous fashion.

In carrying out the above objects and other objects of the present invention a preferred embodiment of the invention includes a driving gear rotatable about a first axis, a driven carrier including a shaft portion rotatable about the first axis and a first planetary shaft mounted on the driven carrier coaxially with a second axis parallel to the first axis. A first planetary gear is mounted on the first planetary shaft so that the planetary gear is rotatable about the second axis and meshes with the driving gear. A first mass is eccentric to the second axis and is coupled to the first planetary gear for rotation together about the second axis. First and second unidirectional clutches are connected to the shaft portion of the driven carrier and operate in opposite directions. One of the first and second unidirectional clutches is also coupled to an output torque shaft to transmit the second torque thereto and to permit continuous rotation of the output torque shaft.

A torque converter assembly constructed in accordance with the present invention includes a plurality of such serially connected torque converters and further includes a housing and a common input driving shaft rotatably supported by the housing and having the first torque. The driving shaft is coupled to each of the driving gears. Each of the masses has a predetermined phase relationship to each of the other masses. A common output torque shaft is rotatably supported by the housing and is connected to one of the first and second clutches of each of the torque converters so that the output torque shaft has the second torque.

The advantages accruing to such a torque converter and assembly utilizing same are numerous. For example, since the output torque shaft is allowed to continuously rotate during operation, a shock-free, relatively smooth operation is provided while, at the same time, providing pulsating torque transmission through the device.

The objects, features and advantages of the present invention are readily apparent from the following detailed description of the preferred mode when taken in connection with the accompanying drawings.

BEST MODE FOR CARRYING OUT THE INVENTION

Figure 1:
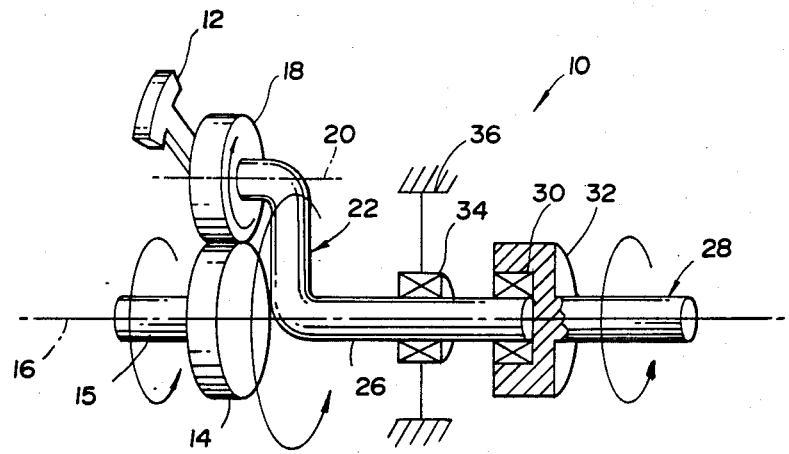
FIG. 1 is a perspective view of a torque converter constructed in accordance with the present invention.

Referring to FIGURE an inertial torque converter constructed in accordance with the present invention is generally indicated by reference numeral 10. The converter having at least one eccentric mass 12 creates inertial radial forces of three types and inertial tangential forces of two types. This is due to the compounded accelerations and rotational motions of an input or driving sun gear 14 rotatable about a first axis 16, a planet gear 18 rotatable about a second axis 20 and a driven carrier, generally indicated at 22, also rotatable about the first axis 16. A driving shaft 15 is coupled to the driving sun gear 14 to drive the gear 14 about the first axis 16.

Figure 2:
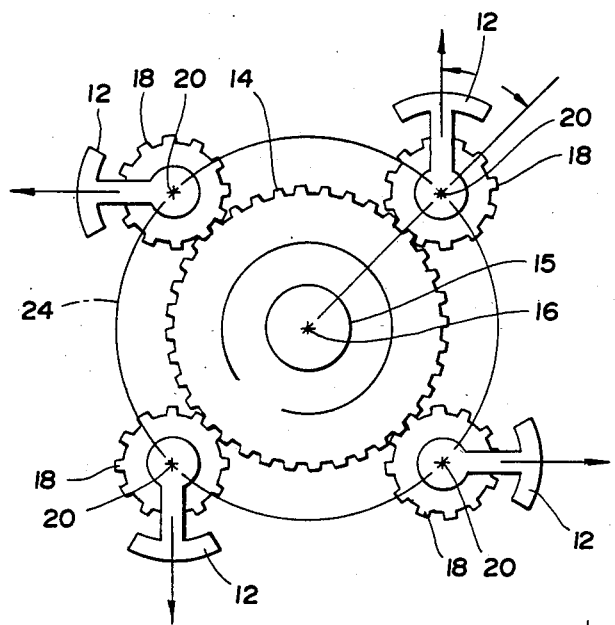
FIG. 2 is an end view of a preferred torque converter illustrating four planet gears and interconnected eccentric masses having a predetermined phase relationship.

Preferably, as shown in FIG. 2, a plurality of such planet gears 18 are utilized together with their eccentric masses 12 which are mounted to rotate therewith about second axes 20. The planet gears 18 are free to rotate about their axes 20. The rotating eccentric masses 12 generate inertial forces which are transmitted to their journals (not shown) within the carrier 22. The tangential component of these forces (i.e. at a circle 24) generates a torque through the journals which is transmitted to the carrier 22. The torque is transmitted to a shaft portion 26 of the carrier 22. Relative to the shaft portion 26, the torque generated can be positive or negative according to the angular position of the masses 12 about their axes.

In the positive half of each revolution of each planet gear 18 the shaft portion 26 of the carrier 22 is accelerated from zero to a maximum output speed. The reverse occurs in the negative half of its rotation. That is, each planet gear 18 is decelerated from the maximum output speed to zero.

While the torque converter of FIG. 2 is balanced around axis 16, each planet gear 18 is not so balanced about its axis 20 due to the offset of its respective eccentric mass 12.

The centrifugal forces generated by the eccentric masses during rotation around the axis of each one of their respective planet gears are indicated by arrows of centrifugal forces in FIG. 2. The centrifugal forces of the masses appearing on opposite sides of the central axis 16 gives a resultant force of zero because the forces are of equal magnitude but in the opposite direction. However, a resultant torque due to the offset of the centrifugal forces from the central axis 16 is generated to rotate the carrier in a counterclockwise direction, as shown in FIG. 2. When the arrows of centrifugal force extend through the center axis 16, no such torque is generated (pointing towards or away form the axis 20).

When the arrow of centrifugal force are at right angles to a line intersecting the central axis 16 and the axis 20 of each planet gear 18, the resulting torque is at its maximum (either positive or negative). A pulsating output is consequently obtained from the converter of FIG. 2 as the eccentric masses rotate about the axes 16 and 20. This causes the converter of FIG. 2 to accelerate from zero to its maximum output speed and vice versa.

Figure 3:
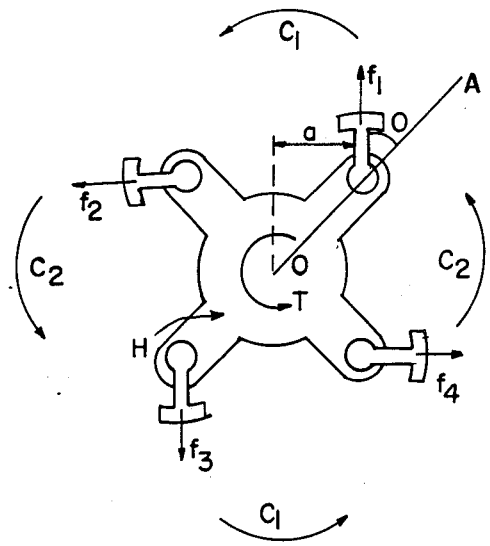
FIG. 3 is a view, partially broken away and in cross-section, of the torque converter.

An output torque shaft, generally indicated at 28 in FIGS. 1 and 3, is connected to the shaft portion 26 of the carrier 22 by a rotating one-way clutch 30 at a hollow, enlarged portion 32 of the output torque shaft 28. In like fashion, the shaft portion 26 of the carrier 22 is connected to a stationary one-way clutch 34 which operates in the opposite direction from the rotating one-way clutch 30. The stationary one-way clutch 34, in turn, is supported by a housing 36. Consequently, the output torque shaft 28 freewheels at the maximum output speed due to the combination of the unidirectional clutches 30 and 34. Also, multiplication is achieved in that a reaction torque is generated at the housing 36 and is equal to the torque difference between the input and output torques at the input shaft 15 and the output shaft 28, respectively.

Due to the rotating clutch 30, the carrier 22 is not directly connected to the output torque shaft 28. The clutch 30 locks in the freewheeling direction of rotation of the stationary clutch 34. When the carrier 22 is stopped by the rotation of the masses 12, the rotating clutch 30 freewheels and the output shaft 28 can continue rotating. In this way, the direction of freewheeling of the clutches 30 and 34 is independent of the direction of rotation of the input shaft 15. Also, continuous rotation of the output shaft 28 can be obtained with torque output being delivered in a pulsating way.

Figure 4:
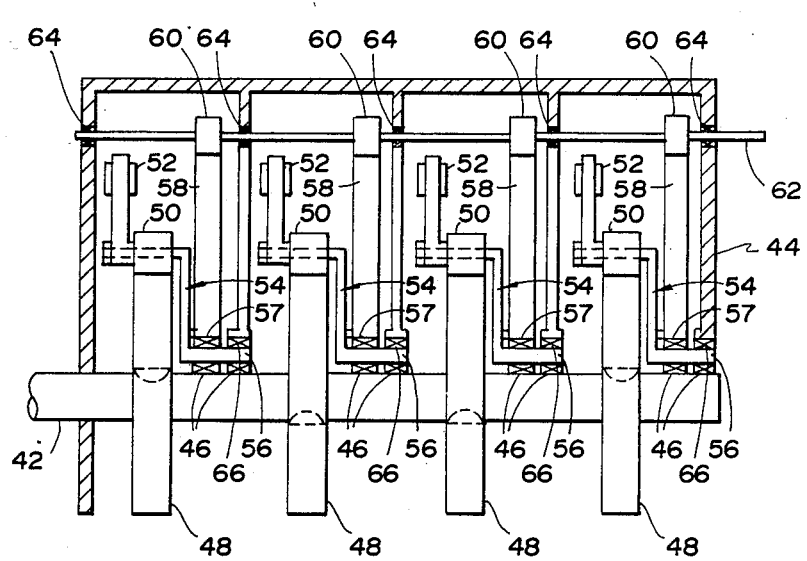
FIG. 4 is a view, partially broken away and in cross-section, of a torque converter assembly utilizing a plurality of such serially connected torque converters.

Referring now to FIG. 4, a torque converter assembly constructed in accordance with the present invention is generally indicated by reference numeral 40. For purposes of simplicity only the upper half of the assembly 40 is illustrated and only one mass for each converter is shown. However, preferably four such masses are provided for each torque converter.

The assembly 40 includes more than one, and preferably four, serially connected torque converters, such as illustrated in FIGS. 1 through 3. The assembly 40 includes a common input shaft 42 which is supported for rotation within a housing 44 by bearings 46. Four equally spaced sun gears 48 are mounted on the input shaft 42 for rotation therewith to drivingly engage their respective planet gears 50.

Eccentric masses 52 are coupled to their respective planet gears 50 to rotate therewith about the sun gear 48. As in the embodiments of FIGS. 1 through 3, the planet gears 50 are free to rotate about their axes. The rotating eccentric masses 52 generate inertial forces which are transmitted to their journals. The tangential component of these forces generates torque which is transmitted to their respective carriers 54 and, consequently, to their shaft portions 56. The shaft portions 56 are hollow cylindrical members to permit the input shaft 42 to rotate coaxially therein.

The eccentric masses 52 of each torque converter are preferably 90 degrees out of phase relative to the corresponding masses of the next adjacent torque converter, although this is not shown in FIG. 4 for purposes of clarity. For example, the left-most torque converter may be assembled with its masses projecting radially outwardly. The next adjacent torque converter is then assembled with its masses projecting tangentially at an angle of 90 degrees clockwise from the prior masses. The next set of eccentric masses are assembled radially inwardly. Finally, the rightmost torque converter has its set of eccentric masses assembled at 270 degrees tangentially clockwise.

The torque is transmitted from the shaft portion 56 of each of the carriers 54 to an output one-way clutch 57 which provides, for example, clockwise locking. The torque, in turn, is transmitted to a transfer gear 58 which is connected to an output pinion gear 60 mounted for rotation with a common output torque shaft 62 rotatably mounted within the housing 44 by bearings 64.

Stopping one-way clutches 66 provide counterclockwise locking and are supported between the housing 44 and the hollow shaft portions 56 of the carrier 54. The clutches 66 transmit the generated reaction torque to the housing 44. The reaction torque is equal to the algebraic addition of the input and output torques on the shafts 42 and 62, respectively.

Figure 5:
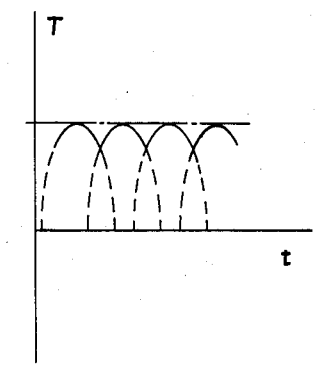
FIG. 5 is a graph illustrating the pulsating nature of the torque pulses applied to the common output torque shaft of FIG. 4.

Torque is transmitted to the output shaft 62 in a pulsating yet smooth and continuous fashion, such as illustrated in FIG. 5. Four torque pulses are generated for each revolution of the output shaft 62 instead of a single torque pulse.

In general, any number of inertial torque converters can be combined to produce yet still smoother torque generation. The only limitation is that the orientation of the masses of adjacent converters is 360/n degrees out of phase where n equals the number of torque converters of the assembly.

While preferred embodiments of a torque converter and an assembly utilizing same have been shown and described herein in detail, those skilled in this art will recognize various alternative designs and embodiments for practicing the present invention as defined by the following claims.

What is claimed is:

1. A torque converter for converting a first torque to a second torque, the converter comprising:
   a housing;
   an input shaft having the first torque;
   a driving sun gear rotatable about a first axis, the input shaft being coupled to the sun gear;
   a driven carrier including a shaft portion rotatable about said first axis;
   a first planetary shaft mounted on said driven carrier coaxially with a second axis parallel to the first axis;
   a first planetary gear meshing with and driven by the sun gear and mounted on the first planetary shaft so that the first planetary gear is rotatable about said second axis;
   a fist mass eccentric to said second axis and coupled to said first planetary gear for rotation together about the second axis;
   first and second unidirectional clutches connected to the shaft portion of said driven carrier and operating in opposite directions;
   an output torque shaft, one if the first and second unidirectional clutches being coupled to the output torque shaft to transmit the second torque thereto in a pulsating fashion and to permit continuous rotation of the output torque shaft and the other one of the first and second unidirectional clutches being connected to the housing to transmit an algebraic addition of the first and second torques together.

2. The converter as claimed in claim 1 further comprising:
   a second planetary shaft mounted on said driven carrier coaxially with a third axis;
   a second planetary gear rotatable about said third axis and meshing with said driving sun gear;
   a second mass eccentric to and rotatable about said third axis; and
   means for coupling said second mass and said second planetary gear for rotation together.

3. The converter as claimed in claim 2 wherein said first mass and said second mass have a predetermined phase relationship to each other.

4. A torque converter assembly comprising a plurality of serially connected torque converters as claimed in claim 1.

5. The assembly as claimed in claim 4 wherein the assembly further comprises:
   a common input driving shaft defined by the input shafts, the driving shaft being rotatably supported by said housing and having the first torque, the driving shaft being coupled to each driving sun gear; and
   a common output torque shaft defined by the output torque shafts, the common output torque shaft being rotatably supported by said housing and connected to one of the first and second clutches of each of the plurality of torque converters so that the output torque shaft has the second torque and wherein the other one of the first and second clutches of each of the plurality of torque converters is connected to the housing to transmit an algebraic addition of the first and second torques thereto.

6. The assembly as claimed in claim 5 wherein said assembly further comprises gearing for connecting the one of the first and second clutches of each of the plurality of torque converters to the output torque shaft to transfer a like plurality of torque pulses to the output torque shaft per revolution of the output torque shaft.

* * * * *